US010789284B2

(12) United States Patent
Kennedy et al.

(10) Patent No.: US 10,789,284 B2
(45) Date of Patent: Sep. 29, 2020

(54) SYSTEM AND METHOD FOR ASSOCIATING TEXTUAL SUMMARIES WITH CONTENT MEDIA

(71) Applicant: FUJI XEROX CO., LTD., Minato-ku, Tokyo (JP)

(72) Inventors: Lyndon Kennedy, San Francisco, CA (US); Francine Chen, Menlo Park, CA (US); Yin-Ying Chen, Sunnyvale, CA (US); David Ayman Shamma, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 209 days.

(21) Appl. No.: 15/953,314

(22) Filed: Apr. 13, 2018

(65) Prior Publication Data
US 2019/0318003 A1    Oct. 17, 2019

(51) Int. Cl.
| | | |
|---|---|---|
| *G06F 16/41* | (2019.01) | |
| *G06N 3/08* | (2006.01) | |
| *G06F 16/34* | (2019.01) | |
| *G06F 16/438* | (2019.01) | |
| *G06F 16/28* | (2019.01) | |
| *G06F 16/55* | (2019.01) | |

(52) U.S. Cl.
CPC ............ *G06F 16/41* (2019.01); *G06F 16/285* (2019.01); *G06F 16/345* (2019.01); *G06F 16/438* (2019.01); *G06F 16/55* (2019.01); *G06N 3/08* (2013.01)

(58) Field of Classification Search
CPC ......... G06F 16/285; G06F 16/55; G06F 16/41
See application file for complete search history.

(56) References Cited

U.S. PATENT DOCUMENTS

| | | | |
|---|---|---|---|
| 2010/0332520 A1* | 12/2010 | Lu ......................... | G06Q 10/10 707/769 |
| 2012/0082401 A1 | 4/2012 | Berger et al. | |
| 2014/0046914 A1* | 2/2014 | Das .................... | G06K 9/00664 707/694 |
| 2017/0132821 A1* | 5/2017 | Valliani ................. | G06F 17/241 |
| 2017/0270123 A1* | 9/2017 | Jhamtani ............. | G06F 16/4393 |

OTHER PUBLICATIONS

Covington, P. et al "Deep Neural Networks for YouTube Recommendations" Sep. 15-19, 2016, pp. 191-198, RecSys '16 Boston, MA, USA (8 pages).

(Continued)

*Primary Examiner* — Charles E Lu
(74) *Attorney, Agent, or Firm* — Procopio, Cory, Hargreaves & Savitch LLP

(57) ABSTRACT

A method and system of associating textual summaries with data representative of media content is provided. The method may include receiving a plurality of textual summaries, each textual summary representative of an event, pairing, by a neural network, each received textual summary with each of a plurality of pieces of data, each piece of data representative of media content, to generate a plurality of text-data pairings; and associating a first selected textual summary with a first piece of data based on a similarity of content features extracted from each received textual summary to content features extracted from each piece of data in each of the plurality of text-data pairings.

17 Claims, 8 Drawing Sheets

(56) References Cited

OTHER PUBLICATIONS

Deng, J. et al. "ImageNet: A Large-Scale Hierarchical Image Database" IEEE Conference on Computer Vision and Pattern Recognition, 2009, pp. 1-8 (8 pages).
Hill, F. et al., "Learning Distributed Representations of Sentences from Unlabelled Data" 2016 (11 pages).
Krizhevsky, A. et al., "ImageNet Classification with Deep Convolutional Neural Networks" Communications of the ACM, Jun. 2017, pp. 1-9, vol. 60 No. 6 (9 pages).
Mikolov, T. et al., "Distributed Representations of Words and Phrases and their Compositionality" Advances in Neural Information Processing Systems 26 (NIPS 2013), Jan. 1, 2013, pp. 1-9 (9 pages).
Wang, B. et al., "Adversarial Cross-Modal Retrieval" ACM Multimedia'17, Oct. 23-27, 2017, pp. 154-162, Mountain View, CA, USA (9 pages).
Yan, F. et al., "Deep Correlation for Matching Images and Text" CVPR 2015, pp. 3441-3450, Boston, MA, USA 2015 (9 pages).
Zhu, Y. et al., "Aligning Books and Movies: Towards Story-like Visual Explanations by Watching Movies and Reading Books" ICCV 2015, pp. 19-27, Santiago, Chile 2015 (9 pages).

* cited by examiner

SYSTEM AND METHOD FOR ASSOCIATING TEXTUAL SUMMARIES WITH CONTENT MEDIA

BACKGROUND

Field

The present disclosure relates to content media album generation, and more specifically, to systems and methods for associating textual summaries with content media to generate content media albums.

Related Art

With the prevalence of media capture devices (e.g., cameras, image capture devices, video capture devices, etc., in Mobile devices), Users often encounter situations where they have acquired a significant or overwhelming number of pieces of digital content media, such as photographs and videos, over the course of attending an event, going on a vacation, or throughout a lifetime. Users may wish to edit the collection into a smaller set of photos, videos, or combination thereof that are more coherent, show the best quality media, and tell a story. Such collections are often shared via "albums" or "sets" on social photo sharing platforms or compiled into books for printing and physical distribution (referred to herein as "photobooks"). However, with related art systems, the creation of such visual summaries must often be done laboriously by users editing and ordering their photos, videos, etc., through desktop or online album or book creation tools. A number of related art systems may provide some level of automation for assisting the users in selecting the best shots, grouping them based on content features or topic or by the people featured in the content media, and otherwise augmenting them with captions and other visual effects.

However, the existing related art media organization tools operate from the starting point of having a set of photos provided by the user and proceeding to apply analyses to determine the content and quality of the photos. The related art systems may then sub-select groups of photos to represent the larger set and often organize them into presentations of multiple photos per page and allow users to reorder and otherwise reorganize the photos on the page. Existing related art systems do not address a reverse situation, wherein a user may provide the captions or textual summaries for each section of a photo book or album, thereby providing some guidance for how or what story might be told. Example implementations of the present application may address this deficiency.

SUMMARY OF THE DISCLOSURE

Aspects of the present application may relate to a method of associating textual summaries with data representative of media content. The method may include receiving a plurality of textual summaries, each textual summary representative of an event, pairing, by a neural network, each received textual summary with each of a plurality of pieces of data, each piece of data representative of media content, to generate a plurality of text-data pairings; and associating a first selected textual summary with a first piece of data based on a similarity of content features extracted from each received textual summary to content features extracted from each piece of data in each of the plurality of text-data pairings.

Additional aspects of the present application may relate to a non-transitory computer readable medium having stored therein a program for making a computer execute a method of associating textual summaries with pieces of data representative of media content. The method may include receiving a plurality of textual summaries, each textual summary representative of an event, pairing, by a neural network, each received textual summary with each of a plurality of pieces of data, each piece of data representative of media content, to generate a plurality of text-data pairings, associating a first selected textual summary with a first piece of data selected from the plurality of pieces of data based on a similarity of content features extracted from each received textual summary to content features extracted from each piece of data in each of the plurality of text-data pairings.

Further aspects of the present application relate to a computer apparatus configured to associate textual summaries with pieces of data representative of media content. The computer apparatus may include a memory storing a plurality of pieces of data representative of media content; and a processor executing a process of visualizing recommended pieces of media content based on a viewed piece of media content. The process may include providing a user with an interface to submit a plurality of textual summaries, each textual summary representative of an event; pairing, by a neural network, each provided textual summary with each of the plurality of pieces of data stored in the memory to generate a plurality of text-data pairings and associating a first selected textual summary with a first piece of data selected from the plurality of pieces of data based on a similarity of content features extracted from each received textual summary to content features extracted from each piece of data in each of the plurality of text-data pairings.

Still further aspects of the present application relate to a computer apparatus configured to associate textual summaries with pieces of data representative of media content. The computer apparatus may include means for receiving a plurality of textual summaries, each textual summary representative of an event; means for pairing each received textual summary with each of a plurality of pieces of data, each piece of data representative of media content, to generate a plurality of text-data pairings; and means for associating a selected first textual summary with a first piece of data selected from the plurality of pieces of data based on a similarity of content features extracted from each received textual summary to content features extracted from each piece of data in each of the plurality of text-data pairings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
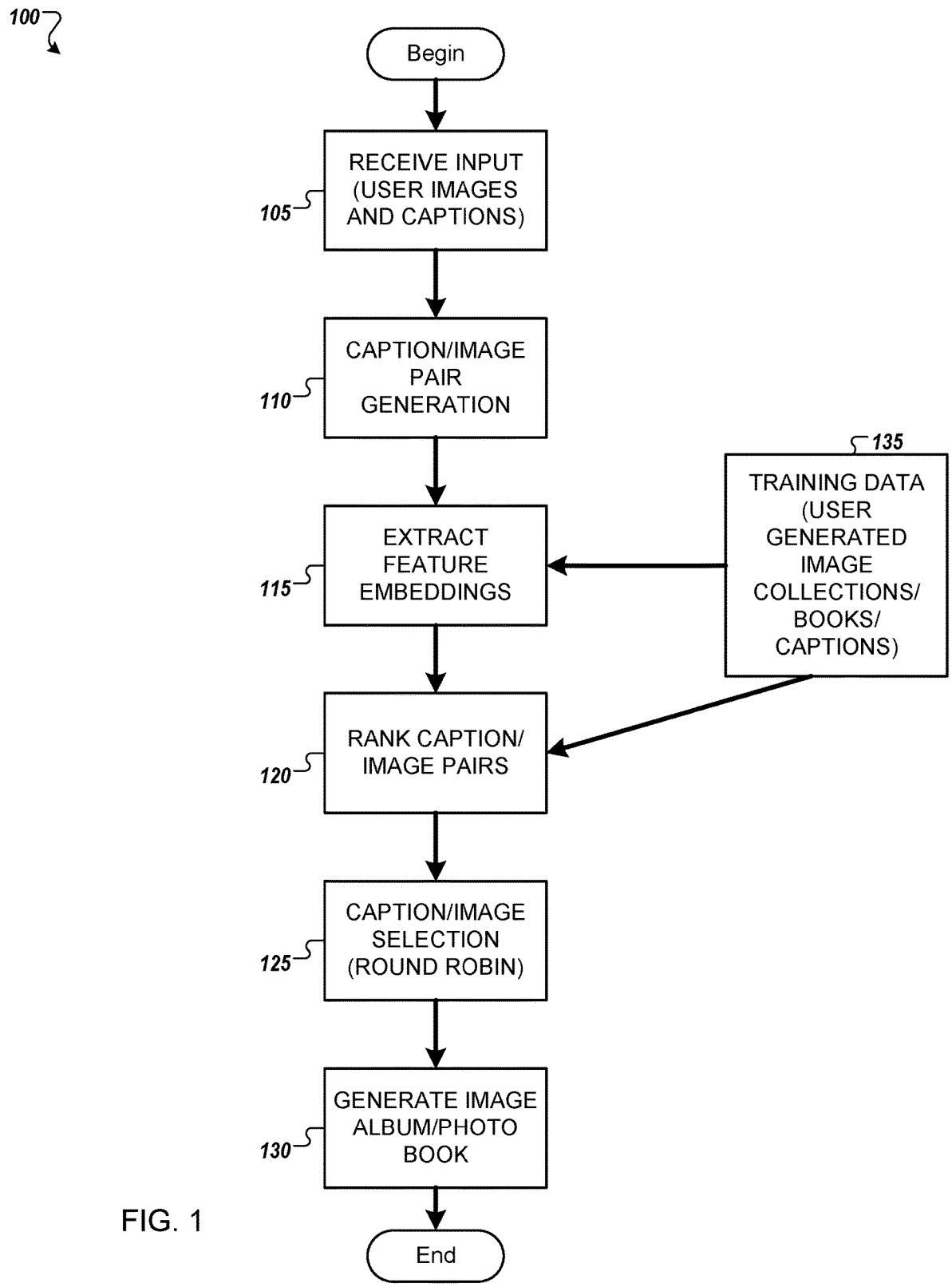
FIG. 1 illustrates a flow chart of a process for generating a photo book in accordance with an example implementation of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application.

In the present application, the terms "image", "content media", "content media representation", or "media representation," may be used interchangeably to describe one or more of a photo, a video, a three-dimensional or 360° image recording, a drawing, painting, a sketch, a computer-generated image, or any other visual representation that may be produced, captured or may otherwise represent an event or occurrence in the real world. These terms may also include a recording or other audio representation that may be produced, captured, or may otherwise represent the event or occurrence in the real world. The "image", "content media", "content media representation", or "media representation" may be captured by any media capture device including, but not limited to, a camera, a digital recorder, analog recorder, mobile communications device, or any other media capture device that may be apparent to a person of ordinary skill in the art. The "content media", "content media representation", or "media representation" may be stored as a data file or other data structure on a computer readable medium including but not limited to a magnetic storage device, an optical storage device, a solid state storage device, an organic storage device or any other storage device that may be apparent to a person of ordinary skill in the art. Further, the computer readable medium may include a local storage device, a cloud-based storage device, a remotely located server, or any other storage device that may be apparent to a person of ordinary skill in the art.

Further, in the present application the terms "caption", "textual summary", or "text summary" may all be used interchangeably to represent a descriptive text-based summary that may be representative of the content of one or more of the described "image", "content media", "content media representation", or "media representation."

In accordance with example implementations of the present application, a user may provide a series of captions or textual summaries related to an event or events and the system may then provide a matching set of photos, videos, etc., from a user's collection to "illustrate" the caption. This may empower the user in situations where they have memories of what situations and events they have captured, but have limited tools and resources to properly retrieve those moments from the collection that they have on hand.

For example, a user returning from a vacation with a memory card full of photographs. Using a system in accordance with an example implementation, the user may then provide an outline of the moments that they would like summarized into a photo book or album by providing a series of captions that describe the events that they would like depicted, such as "We had a great day at the beach," "Dad tried parasailing," or "The burritos were delicious." The system may then rank all of the images according to their relevance to each caption and provide images of a beach day, parasailing, and burritos, respectively to correspond to the captions.

In another example implementation, a user may have posted to a social media account or microblog platform (e.g., TWITTER, etc.) during the trip and the user may provide the system with access to the user's social media account or microblog and the posts may be retrieved by the system to be used as the captions or textual summaries to be illustrated with representative photos or other pieces of media content to create the photo book or album.

In other example implementations, the system may be used to index and identify relevant sections of a large content media representation such as a surveillance video, point-of-view or egocentric video (e.g., a GoPro Video), education lecture recording, extended interview recording, or any other type of large content media representation that may be apparent to a person of ordinary skill in the art. For example, the system may be used to identify one or more image frames or audio sections in the large content media representation associated with the content feature based on captions or textual summaries provided by user.

Further, other example implementations may include a system configured to generate photo books from user-provided captions by querying a collection of images. In these implementations, the input to the system may be a user's photo collection or a temporal, topical, or geographic sub-segment of their collection, as well as a series of captions or other textual summaries, which the user would like to have "illustrated" using photographs from the provided collection. The system may work by learning from (e.g., trained using) manually created photo books or photo sets (e.g., training data) provided from multiple users of book or photo set creation tools. In these implementations, the captions (of the training data), which the user has chosen to associate with subsets of photos (of the training data) within the albums or books may be extracted as well as additional photos from the user's collections and their status as being included along with the caption or not (in the training data). Using this training data set, the system may learn representations of the provided captions or textual summaries and the visual content of the images and associated metadata. The system may then use a model to predict the relevance of each image to the associated caption. These representations and models may then be used to predict whether a user would select a given image to be associated with a given caption. Using these predictions, the images may be ranked according to their predicted relevance for each caption and images may then be selected for each caption using a round-robin selection approach.

Each of the example implementations discussed herein, demonstrate an approach for illustrating captions using a machine-learned matching system, wherein the relevance of images to captions may be learned based on historical examples of caption-image pairs provided by users. This approach may involve several components to provide automatic associations between images and captions:

- a large database of images, which have been manually sub-selected into groups with associated captions or textual summaries;
- a method of representing semantic content of both the images within the database and the associated captions; and
- a method of predicting the relevance of a given image to a provided caption.

Other aspects of example implementations are discussed in detail below with respect to the attached figures.

FIG. 1 illustrates a flow chart of a process 100 for generating a photo book in accordance with an example implementation of the present application. The process 100 may be performed by a computing device in a computing environment such as example computer device 805 of the example computing environment 800 illustrated in FIG. 8 discussed below. Though the elements of process 100 may be illustrated in a particular sequence, example implementations are not limited to the particular sequence illustrated. Example implementations may include actions being ordered into a different sequence as may be apparent to a person of ordinary skill in the art or actions may be performed in parallel or dynamically, without departing from the scope of the present application.

As illustrated in FIG. 1, user input is received by the system at 105. This user input may include a user's set of images and user-provided captions that the user would like illustrated. After the user input has been received, the system may generate caption-image pairs at 110 by pairing each provided caption with each possible image in the user-provided image set.

At 115, features may be extracted for both the captions and images to produce featuring embeddings associated with both the captions and the images. The feature extraction of 115 may be performed using a neural network that has been trained at 135 using training data. The training data may include user manually-generated image collection or photo books that have been captioned by users using photo album editing or photo book generation platforms, which may be web-based, mobile application based, or installed on the local machine. For each image/caption pair, the features (embeddings) may be concatenated together.

In some example implementations, the content feature extraction may include producing a representation space for the captions provided by the users and the candidate images that can be applied to illustrate those captions. To represent content features of each candidate photo and each caption, sub-networks may be trained on different tasks to learn embeddings.

For example, a text embedding can be learned using existing techniques (e.g., "word2vec") to learn a vector encoding to represent words extracted from captions or textual summary. Further, in some example implementations, text recognition techniques (e.g., Optical Character Recognition, etc.) may also be used to extract words from the images. A network of this type may have a simple architecture of taking a large dimensional one-hot representation of a vocabulary and then mapping it through a much lower dimensional set of nodes to predict terms in the same one-hot representation in the final layer. This network can be trained by providing a large corpus of text and using one-hot representations of the current term and training the network to predict the subsequent terms in the text. For the text captions that the users provide, each term may be passed through this network and the representations of each term may be retained in the middle, low-dimensional layer. The representation values may be used as feature representations of the text terms.

Further, a number of methods may be used to embed a sentence or phrase. For example, neural methods that utilize the context of adjacent words or sentences may be used effectively by employing the word2vec representation discussed as input and embedding the captions into a low-dimensional embedding.

For extracting features to represent images, a deep convolutional neural network may be trained on a large corpus (e.g., "ImageNet"). In this type of network, images may be passed through a series of convolutional layers with max pooling and ReLU activations. After the convolutional layers, several flattened fully-connected layers are applied for the final task of categorizing the image, typically into one of the ImageNet classes. Once a network is trained on this data, user-provided images may be passed through the network and the penultimate layer output can be used as a feature representation applied towards the selection task discussed below.

In some example implementations, image representations may also be further enhanced with metadata reflecting further informational cues about the capture of the image, such as the timestamp, geographic coordinates, and camera settings. Further in some example implementations, automatic systems may also be employed to enhance such metadata with information extracted from the images, such as the identities of the people in the image or the projected aesthetic quality of the image. Additionally, data indicative of a particular user's past preferences or past album or photo book generation selections may also be fed into the model to further improve feature extraction and image selection.

At 120, each image/caption pair may be passed through a scoring model developed by the neural network based on the training data to predict the relevance of each image to each caption. For each caption, the images may then be ranked using the score model. In some example implementations, once the content representations are obtained from 115, a model for learning the likelihood of an image from a user's larger collection being relevant to the provided caption may be applied to select, score, and rank the caption/image pairs at 120. This may be done by compiling a dataset of image collections belonging to various users and subsequent albums or photo books that they have generated from those photo collections along with the captions that the various users have provided for each image or group of images. For each caption that a user has manually used in a photo book, a training pair may be created for that caption and each image in the user's entire image collection. A binary classifier may then be used to model whether the photo was in fact selected by the user for inclusion with that caption. The captions may be passed through a neural network to extract embeddings for modeling the text. Similarly, each image is passed through the image modeling subnetwork and the embeddings there are used to represent the image. Metadata features may also be extracted. For each image-caption pair, these representations may be concatenated together as an input for further modeling. A deep network of dense layers where the final layer is a softmax layer predicting either inclusion ("1") or exclusion ("0") from the caption set may then be applied. During the ranking, each user-provided caption is paired with every image in his or her collection and scored based on its relevance to the caption. Images are then ranked according to the returned score.

Based on the rankings, an image may then be selected at 125 for each caption without replacement (e.g., no new images being provided) until the requisite number of images for each caption have been found. For example, images in the top-k set or those exceeding some threshold may be returned as the set of matching photos for a given caption. In some example implementations, a greedy selection algorithm may be used at 125 to select an optimal (e.g., highest ranked) image for each caption. Further, in some example implementations, once an image has been selected for association with a given caption, that same image is excluded from association with any other caption in a given album or photo book. Example implementations of this are discussed in greater detail below.

Once the requisite number of images has been associated with each user-provided caption, the image album or photo book may be generated in accordance with user settings at 130 and the process may end. In some example implementations, the user settings may be provided by a user interface such as user interfaces 600 and 700 illustrated in FIGS. 6 and 7 discussed in greater detail below. In some example implementations the user settings may be provided by settings associated with image capture devices and/or additional training data based on the user's previous albums or photo books.

Figure 2:
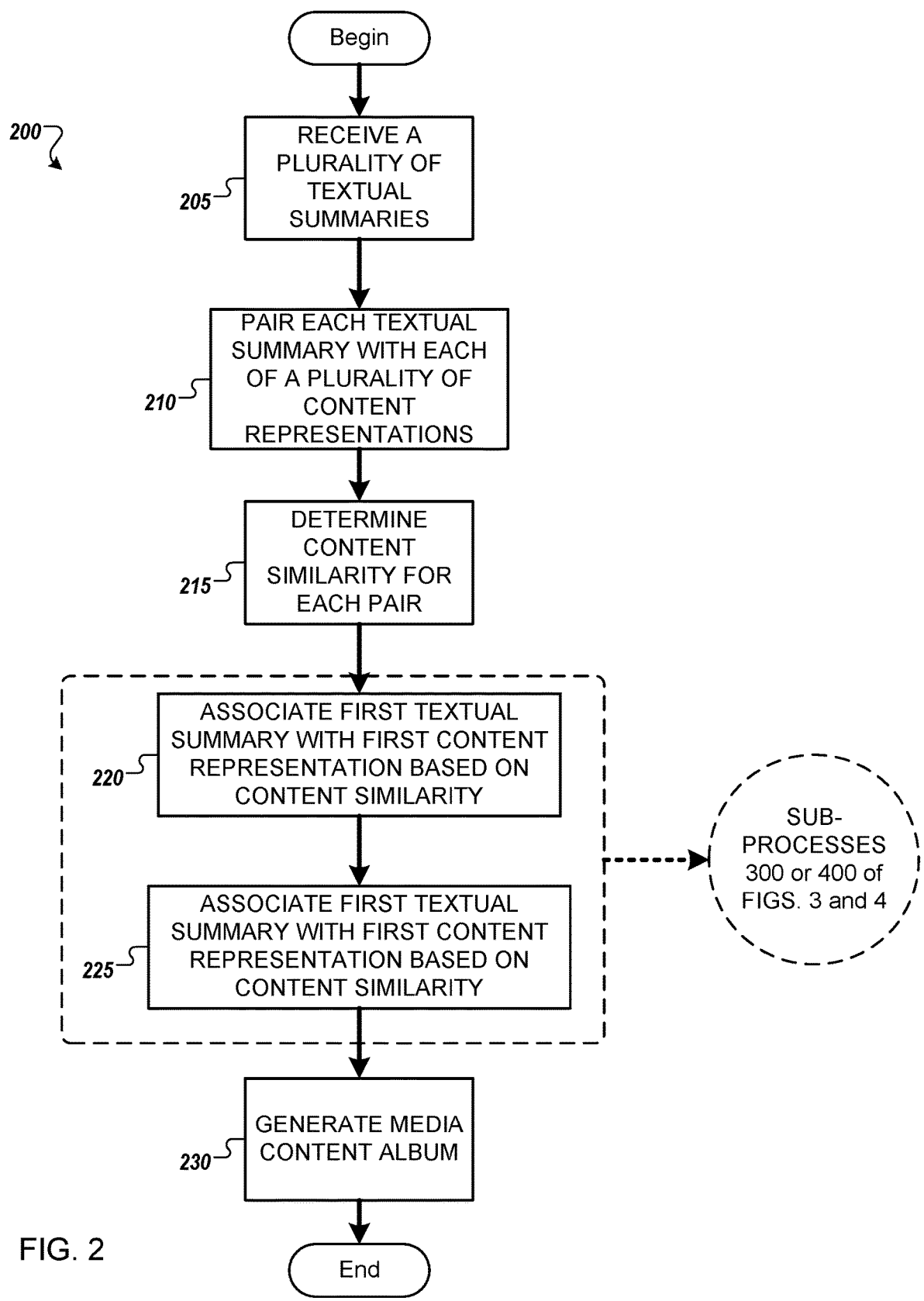
FIG. 2 illustrates a flow chart of a process for generating a photo book in accordance with another example implementation of the present application.

FIG. 2 illustrates a flow chart of a process 200 for generating a media content album in accordance with another example implementation of the present application. Some aspects of the process 200 may be similar to the process 100 discussed above with respect to FIG. 1 as such redundant discussion may be omitted herein. The process 200 may be performed by a computing device in a computing environment such as example computer device 805 of the example computing environment 800 illustrated in FIG. 8 discussed below. Though the elements of process 200 may be illustrated in a particular sequence, example implementations are not limited to the particular sequence illustrated. Example implementations may include actions being ordered into a different sequence as may be apparent to a person of ordinary skill in the art or actions may be performed in parallel or dynamically, without departing from the scope of the present application.

Again, a user input is received by the system at 205. In the process 200, this user input may include user-provided textual summaries or captions that the user would like illustrated. The images or content representations may have been previously provided to the system or the system may be integrated into an image management system or social media platform already. In some example implementations, the textual summaries may be provided by extracting social media posts or microblog posts from a social media platform.

After the user input has been received, the system may generate text summary-content representation pairs at 210 by pairing each provided text summary with each possible content representation.

At 215, content similarity values are determined for each text summary-content representation pair. As discussed with the example implementation of FIG. 1, this may include extracting content features of both the textual summaries and content representations images to produce featuring embeddings associated with both the captions and the images. The feature extraction may be performed using a neural network that has been trained using training data. The training data may include user manually-generated image collections or photo books that have been captioned by other users of an album editing or photo book generation platform accessible via the web, a mobile application, or software installed on a local machine. For each content representation/textual summary pair, the extracted features (embeddings) may be concatenated together.

Again, to represent content features of each content representation and textual summary, sub-networks may be trained on different tasks to learn embeddings. For example, a text embedding may include using existing techniques (e.g., "word2vec") to learn a vector encoding representing words extracted from the captions or textual summary. In some implementations, text recognition techniques (e.g., Optical Character Recognition, etc.) may also be used to extract words from images as part of the text extraction. The neural network may have a simple architecture of taking a large dimensional one-hot representation of a vocabulary and then mapping it through a much lower dimensional set of nodes to predict terms in the same one-hot representation in the final layer. This type of network may be trained by providing a large corpus of text and using one-hot representations of the current term and training the network to predict the subsequent terms in the text. For the text summaries that the users provide, each term may be passed through this network and the representations of each term may be retained in the middle, low-dimensional layer. The representation values may be used as feature representations of the text terms.

Further, a number of methods may be used to embed a sentence or phrase. For example, neural methods that utilize the context of adjacent words or sentences may be used effectively by employing the word2vec representation discussed as input and embedding the captions into a low-dimensional embedding.

With respect to extracting content features to represent images, a deep convolutional neural network may be trained on a large corpus (e.g., "ImageNet"). In this network, images may be passed through a series of convolutional layers with max pooling and ReLU activations. After the convolutional layers, several flattened fully-connected layers are applied for the final task of categorizing the image, typically into one of the ImageNet classes. Once a network is trained on this data, user-provided images may be passed through the network and the penultimate layer output can be used as a feature representation applied towards the selection task discussed below.

In some example implementations, image representations may also be further enhanced with metadata reflecting further informational cues about the capture of the image, such as the timestamp, geographic coordinates, and camera settings and may also use automatic systems to enhance the metadata with information extracted from the images, such as the identities of the people in the image or the projected aesthetic quality of the image. Additionally, data indicative of a particular user's past preferences or more past album or photo book generation selections may also be fed into the model to further improve feature extract and image selection.

Once content similarity has been determined for each textual summary-content representation pair, a first textual summary may be associated with a first content presentation based on the content similarities for each of the textual summary-content representation pairs at 220 to produce a first associated pair. Similarly, a second textual summary may be associated with a second content representation based on the content similarities for each of the textual summary-content representation pairs at 225 to produce a second associated pair. Example implementations of 220 and 225 may be performed using one or more of sub-processes 300 and 400 illustrated below in FIGS. 3 and 4 respectively. Additionally, in some example implementations, 220 and 225 may be repeated until a desired number of associated pairs (e.g., three, four, five, etc., associated pairs of textual summary-content representation) based on the content similarities determined for each text summary-content representation pair.

Once the desired number of associated pairs has been produced, an image album or photo book may be generated in accordance with user settings at 230 and the process may end. In some example implementations, the user settings may be provided by a user interface such as user interfaces 600 and 700 illustrated in FIGS. 6 and 7 discussed in greater detail below. In some example implementations the user settings may be provided by settings associated with image capture device and/or additional training data based on the user's previous albums or photo books.

Figure 3:
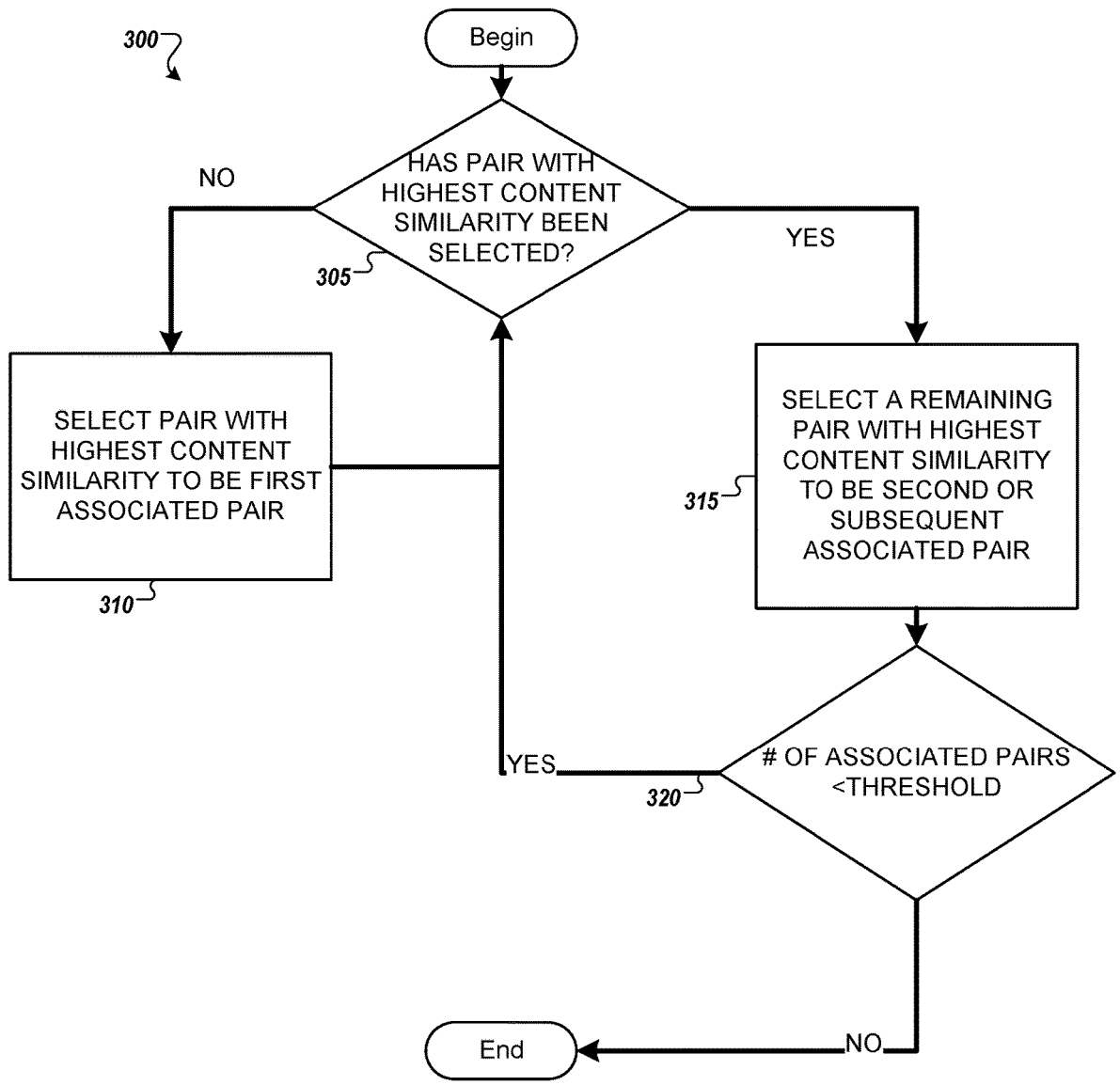
FIG. 3 illustrates a flow chart of a sub-process for forming associated pairs based on a content similarity in accordance with an example implementation of the present application.

FIG. 3 illustrates a flow chart of a sub-process 300 for forming associated pairs based on a content similarity. The sub-process 300 may be performed as part of a larger process to generate content media albums such as processes 100, 200, and 500 of FIGS. 1, 2, 5 all discussed herein. The sub-process 300 may be performed by a computing device in a computing environment such as example computer device 805 of the example computing environment 800 illustrated in FIG. 8 discussed below. As used with respect to FIG. 3, the term "pair" may be a caption-image pair, a textual summary-content representation pair, textual summary-data cluster pair, or any other text summary image representation pair that might be apparent to a person of ordinary skill in the art.

Though the elements of sub-process 300 may be illustrated in a particular sequence, example implementations are not limited to the particular sequence illustrated. Example implementations may include actions being ordered into a different sequence as may be apparent to a person of ordinary skill in the art or actions may be performed in parallel or dynamically, without departing from the scope of the present application.

When creating a photo book or album, the users will sometimes be trying to "illustrate" multiple captions and compiling all of the caption-image sets into a larger collection. This situation may impose additional constraints on the system in that typically each photo should only be associated with a single caption in order to avoid repetition of photos across the larger book. In some example implementations, a greedy approach may be applied to matching images to captions as illustrated by sub-process 300. In sub-process 300, the pairs with the highest similarity remaining could be selected for the photo book or image album iteratively until each caption has collected its required number of images or the number of "good" matches (those exceeding some threshold score) has been exhausted for each caption image set.

In the sub-process 300, the set of ranked pairs is evaluated at 305 to determine whether the pair having the highest content similarity has already been selected. If the pair having the highest content similarity has not already been selected (NO at 305) the pair having the highest content similarity is selected as the first associated pair at 310, both components of the selected pair (e.g., the caption/textual summary and the image/content representation/data cluster) are removed from further consideration and the sub-process 300 returns to 305.

Conversely, if the pair having the highest content similarity has already been selected (YES at 305), the pair having the highest content similarity from the remaining pairs is selected as the second or subsequent associated pair at 315, both components of the selected pair (e.g., the caption/textual summary and the image/content representation/data cluster) are removed from further consideration and the sub-process 300 proceeds to 320.

At 320, a determination is made whether the number of associated pairs so far selected is less than a threshold value. In some example implementations, the threshold value may represent a user setting of the number of captions/textual summaries or images/content representations/data clusters to be produced in the generated media content album. In some example implementations, the threshold may be set using a user interface such as user interface 600 or 700 illustrated in FIGS. 6 and 7 discussed in greater detail below. If the number of associated pairs so far selected is less than the threshold value (YES at 320), the sub-process 300 returns to 305 and then continues from there. Conversely, if the number of associated pairs so far selected is not less than the threshold value (NO at 320), the sub-process 300 ends and the main process for generating the content media album may continue.

Figure 4:
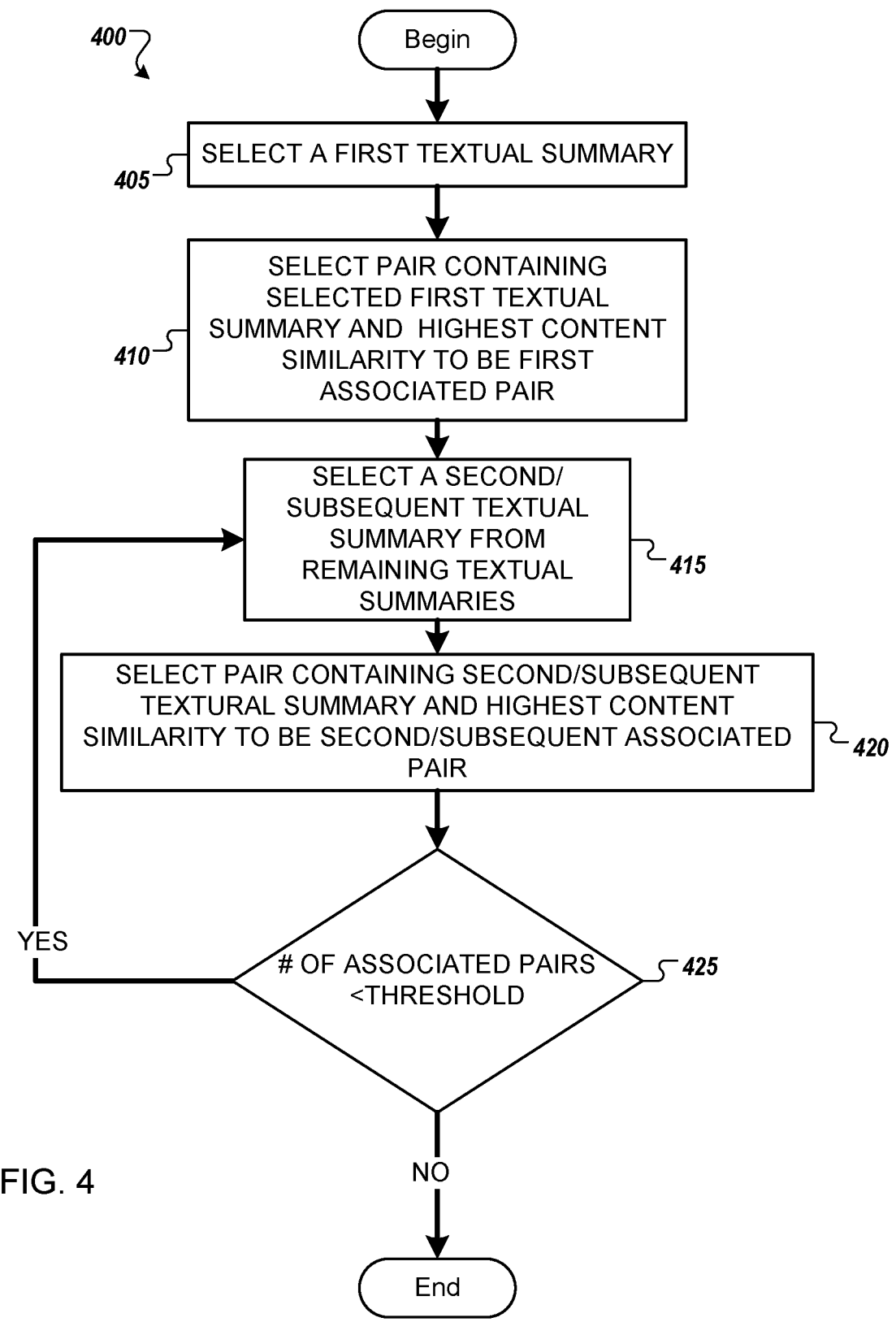
FIG. 4 illustrates a flow chart of a sub-process for forming associated pairs based on a content similarity in accordance with another example implementation of the present application.

FIG. 4 illustrates a flow chart of a sub-process 400 for forming associated pairs based on a content similarity. The sub-process 300 may be performed as part of a larger process to generate content media albums such as processes 100, 200, and 500 of FIGS. 1, 2, 5 all discussed herein. The sub-process 400 may be performed by a computing device in a computing environment such as example computer device 805 of the example computing environment 800 illustrated in FIG. 8 discussed below. As used with respect to FIG. 4, the term "pair" may be a caption-image pair, a textual summary-content representation pair, textual summary-data cluster pair, or any other text summary image representation pair that might be apparent to a person of ordinary skill in the art.

Though the elements of sub-process 400 may be illustrated in a particular sequence, example implementations are not limited to the particular sequence illustrated. Example implementations may include actions being ordered into a different sequence as may be apparent to a person of ordinary skill in the art or actions may be performed in parallel or dynamically, without departing from the scope of the present application.

When creating a photo book or album, the users will sometimes be trying to "illustrate" multiple captions and compiling all of the caption-image sets into a larger collection. This situation may impose additional constraints on the system in that typically each photo should only be associated with a single caption in order to avoid repetition of photos across the larger book. In some example implementations, a round-robin image selection approach, wherein the first caption selects its top-ranked image for inclusion in its set and this image is thereby removed from the candidates for all other caption sets. Then, a second caption takes its top-ranked image from the remaining images. This process may be repeated until all image sets have selected their required number of images from the pool. Sub-process 400 in FIG. 4 illustrates an example of this approach.

In the sub-process 400, a first one of the textual summaries or captions is selected at 405. The selection of the first textual summary or caption may be random, may be based on order of entry by a user, may be selected in response to a user input or may be selected based on a previous user preference.

Once a first textual summary or caption has been selected, the pair containing the selected first textual summary and having the highest content similarity is selected as the first associated pair at 410, both components of the selected pair (e.g., the caption/textual summary and the image/content representation/data cluster) are removed from further consideration and the sub-process 400 proceeds to 415.

At 415, a second or subsequent one of the textual summaries or captions is selected at 415. The selection of the second or subsequent textual summary or caption may be random, may be based on order of entry by a user, may be selected in response to a user input or may be selected based on a previous user preference. Once a second or subsequent textual summary or caption has been selected, the pair containing the selected second or subsequent textual summary and having the highest content similarity is selected as the second or subsequent associated pair at 420, both components of the selected pair (e.g., the caption/textual summary and the image/content representation/data cluster) are removed from further consideration and the sub-process 400 proceeds to 425.

At 425, a determination is made whether the number of associated pairs so far selected is less than a threshold value. In some example implementations, the threshold value may represent a user setting of the number of captions/textual summaries or images/content representations/data clusters to be produced in the generated media content album. In some example implementations, the threshold may be set using a user interface such as user interface 600 or 700 illustrated in FIGS. 6 and 7 discussed in greater detail below. If the number of associated pairs so far selected is less than the threshold value (YES at 425), the sub-process 400 returns to 415 and then continues from there. Conversely, if the number of associated pairs so far selected is not less than the threshold value (NO at 425), the sub-process 400 ends and the main process for generating the content media album may continue.

Figure 5:
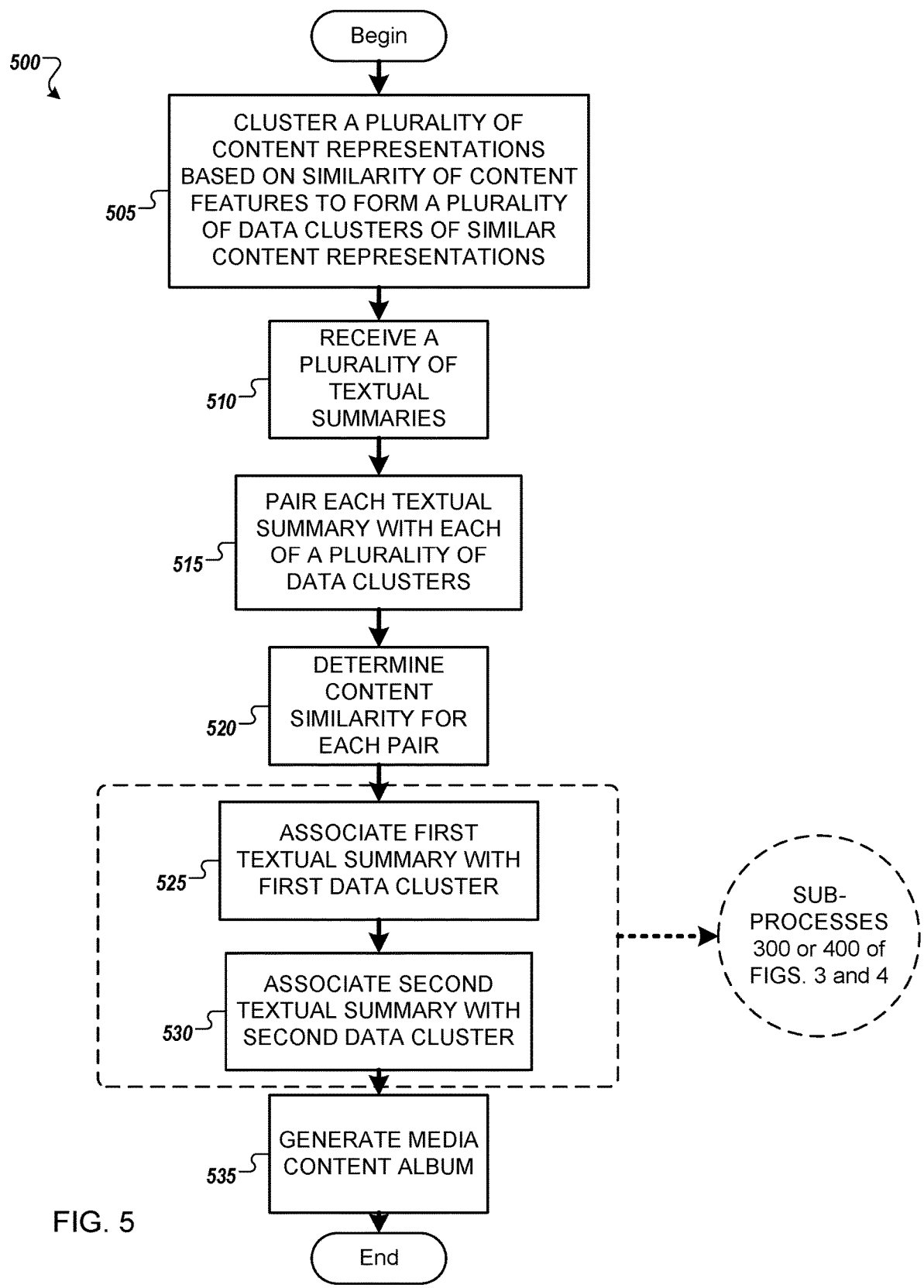
FIG. 5 illustrates a flow chart of a process for generating a photo book in accordance with another example implementation of the present application.

FIG. 5 illustrates a flow chart of a process 500 for generating a media content album in accordance with another example implementation of the present application. Some aspects of the process 500 may be similar to the processes 100 and 200 discussed above with respect to FIGS. 1 and 2 above and as such, redundant discussion may be omitted herein. The process 500 may be performed by a computing device in a computing environment such as example computer device 805 of the example computing environment 800 illustrated in FIG. 8 discussed below. Though the elements of process 500 may be illustrated in a particular sequence, example implementations are not limited to the particular sequence illustrated. Example implementations may include actions being ordered into a different sequence as may be apparent to a person of ordinary skill in the art or actions may be performed in parallel or dynamically, without departing from the scope of the present application.

In the process 500, a plurality of images or content representations may be clustered or divided into subsets of images or content representations based on content similarities between different images or content representations at 505. This may include extracting content features from the content representations or images to produce featuring embeddings. The feature extraction may be performed using a neural network that has been trained using training data.

Again, to represent content features of each content representation, sub-networks may be trained on different tasks to learn embeddings. For example, a text embedding may include using existing techniques (e.g., "word2vec") to learn a vector encoding representing words extracted from the content representation using text recognition techniques (e.g., Optical Character Recognition, etc.) by extracting words from images as part of the text extraction. The neural network may have a simple architecture of taking a large dimensional one-hot representation of a vocabulary and then mapping it through a much lower dimensional set of nodes to predict terms in the same one-hot representation in the final layer. This type of network may be trained by providing a large corpus of text and using one-hot representations of the current term and training the network to predict the subsequent terms in the text. The representation values may be used as feature representations of the text terms.

Further, a number of methods may be used to embed a sentence or phrase. For example, neural methods that utilize the context of adjacent words or sentences may be used effectively by employing the word2vec representation discussed as input and embedding the captions into a low-dimensional embedding.

With respect to extracting content features to represent images, a deep convolutional neural network may be trained on a large corpus (e.g., "ImageNet"). In this network, images may be passed through a series of convolutional layers with max pooling and ReLU activations. After the convolutional layers, several flattened fully-connected layers are applied for the final task of categorizing the image, typically into one of the ImageNet classes. Once a network is trained on this data, the content representations may be passed through the network and the penultimate layer output can be used as a feature representation applied to a cluster of the content representations to form data clusters of subsets of content representations.

In some example implementations, image representations may also be further enhanced with metadata reflecting further informational cues about the capture of the image, such as the timestamp, geographic coordinates, and camera settings and may also use automatic systems to enhance the metadata with information extracted from the images, such as the identities of the people in the image or the projected aesthetic quality of the image.

Using the determined embeddings the content representations may be clustered prior to assigning them to particular text summaries captions. Each data cluster or subset of content representations may be associated with a caption based on the aggregate strength of the images associated with each group. In the case where strong metadata cues, such as the time content representations, were captured or the locations in which they were taken may also be used to ensure that event-driven groupings of images are not split across multiple text summary-content representation sets.

After the data clusters are produced, a user input is received by the system at 510. In the process 500, this user input may include user provided textual summaries or captions that the user would like illustrated. In some example implementations, the textual summaries may be provided by extracting social media posts or microblog posts from a social media platform.

After the user input has been received, the system may generate text summary-data cluster pairs at 515 by pairing each provided text summary with each possible data cluster or subset of content representations.

At 520, content similarity values are determined for each text summary-data cluster pair. As discussed with the example implementation of FIG. 1, this may include extracting content features the textual summaries and comparing with the aggregate content embeddings determined in 505 of each data cluster to produce featuring embeddings associated with both the captions and the data clusters. The feature extraction may be performed using a neural network that has been trained using training data. The training data may include user manually-generated image collections or photo books that have been captioned by other users of an album editing or photo book generation platform accessible via the web, a mobile application, or software installed on a local machine. For each text summary-data cluster pair, the extracted features (embeddings) may be concatenated together.

Again, to represent content features of each data cluster and textual summary, sub-networks may be trained on different tasks to learn embeddings. For example, a text embedding may include using existing techniques (e.g., "word2vec") to learn a vector encoding representing words extracted from the captions or textual summary. In some implementations, text recognition techniques (e.g., Optical Character Recognition, etc.) may also be used to extract words from images of each data cluster as part of the text extraction. The neural network may have a simple architecture of taking a large dimensional one-hot representation of a vocabulary and then mapping it through a much lower dimensional set of nodes to predict terms in the same one-hot representation in the final layer. This type of network may be trained by providing a large corpus of text and using one-hot representations of the current term and training the network to predict the subsequent terms in the text. For the text summaries that the users provide, each term may be passed through this network and the representations of each term may be retained in the middle, low-dimensional layer. The representation values may be used as feature representations of the text terms.

Further, a number of methods may be used to embed a sentence or phrase. For example, neural methods that utilize the context of adjacent words or sentences may be used effectively by employing the word2vec representation discussed as input and embedding the captions into a low-dimensional embedding.

With respect to extracting content features to represent images, a deep convolutional neural network may be trained on a large corpus (e.g., "ImageNet"). In this network, images may be passed through a series of convolutional layers with max pooling and ReLU activations. After the convolutional layers, several flattened fully-connected layers are applied for the final task of categorizing the image, typically into one of the ImageNet classes. Once a network is trained on this data, user-provided images of each data cluster may be passed through the network and the penultimate layer output can be used as a feature representation applied towards the selection task discussed below.

In some example implementations, image representations of each data cluster may also be further enhanced with metadata reflecting further informational cues about the capture of the image, such as the timestamp, geographic coordinates, and camera settings and may also use automatic systems to enhance the metadata with information extracted from the images, such as the identities of the people in the image or the projected aesthetic quality of the image. Additionally, data indicative of a particular user's past preferences or more past album or photo book generation selections may also be fed into the model to further improve feature extract and image selection.

Once content similarity has been determined for each text summary-data cluster pair, a first textual summary may be associated with a first data cluster based on the content similarities for each of the text summary-data cluster pairs at 525 to produce a first associated pair. Similarly, a second textual summary may be associated with a second data cluster based on the content similarities for each of the text summary-data cluster pairs at 530 to produce a second associated pair. Example implementations of 525 and 530 may be performed using one or more of sub-processes 300 and 400 illustrated above in FIGS. 3 and 4 respectively. Additionally, in some example implementations, 525 and 530 may be repeated until a desired number of associated pairs (e.g., three, four, five, etc., associated pairs of textual summary-data clusters) based on the content similarities determined for each textual summary-data cluster pair.

Once the desired number of associated pairs has been produced, an image album or photo book may be generated in accordance with user settings at 535 and the process may end. In some example implementations, the user settings may be provided by a user interface such as user interfaces 600 and 700 illustrated in FIGS. 6 and 7 discussed in greater detail below. In some example implementations the user settings may be provided by settings associated with image capture device and/or additional training data based on the users previous albums or photo books.

Figure 6:
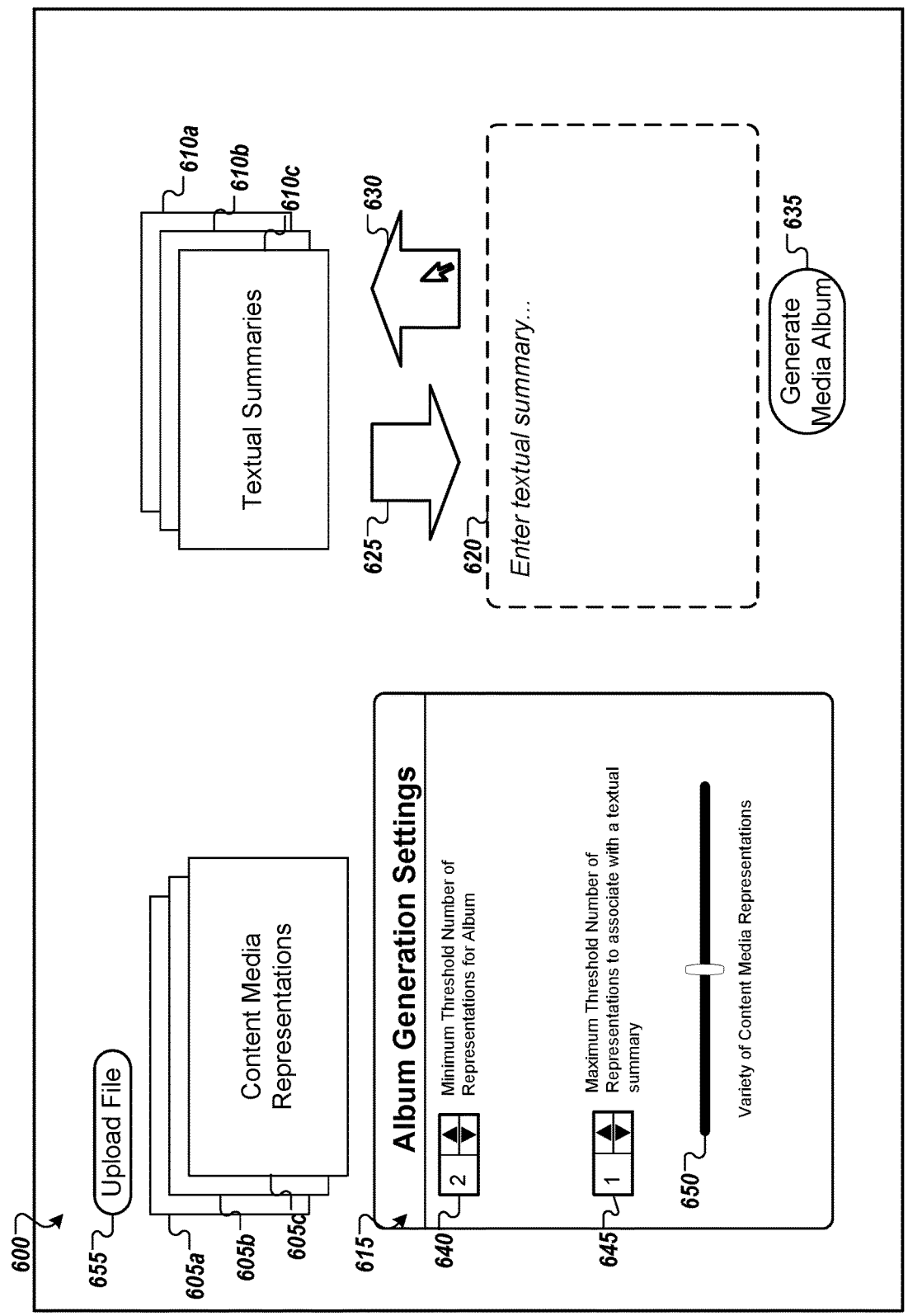
FIGS. 6 and 7 illustrate user interfaces (UIs) that may be used to control the system in accordance with an example implementation of the present application.
Figure 7:
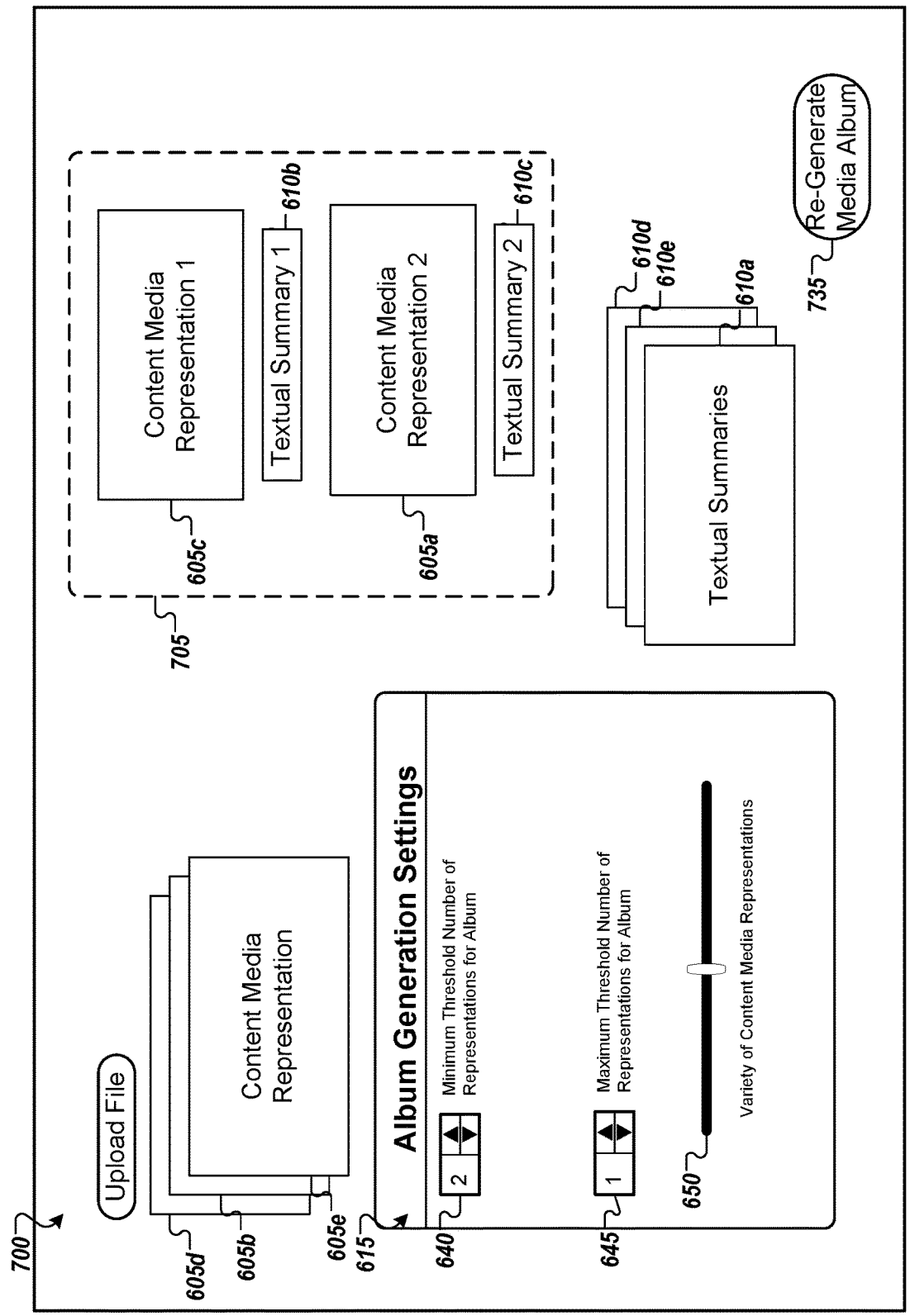

FIGS. 6 and 7 illustrate user interfaces (UIs) 600 and 700 that may be used to control the system in accordance with an example implementation of the present application. The UIs 600 and 700 may be displayed on a display device including, but not limited to, a computer monitor, TV, touchscreen display of a mobile device, a laptop display screen, or any other display device that may be apparent to a person of ordinary skill in the art.

As illustrated in FIG. 6, the UI 600 may include a display of the content media representations or images 605*a*-605*c* and the textual summaries 610*a*-610*c*. The UI 600 may also include an album generations setting region 615 that may be used by a user to provide settings controls 640-650 for the albums to be generated and a text entry window 620 into which the user may type additional textual summaries.

Within the album generations setting region 615, setting control 640, illustrated as a text entry field with up-and-down clickable icons, may be used to select a minimum threshold number of representations to be used for generation of the album. This threshold setting may be used in the above-described processes (e.g., processes 100, 200, 500 and sub-processes 300, 400) to determine when a process or sub-process shall be terminated. Further, setting control 645, illustrated as a text entry field with up-and-down clickable icons, may be used to select a maximum threshold number of representations to be associated with any caption or textual summary. This threshold setting may be used to define the size or limit the production of subsets of content representations used to form data clusters in the above-described processes (e.g., processes 100, 200, 500 and sub-processes 300, 400). Additionally, setting control 650, illustrated as a slider bar control, may be used to define the variety in content media representations which are selected to be paired with different textual summaries in the media album. For example, if the slider bar is used to define that a large variety of content media representations should be used, the system may compare the similarity of content media representations that have been selected for pairing with different captions and select alternative content media representations with greater dissimilarity in order to provide greater variety in the album being produced. Conversely if the slider bar is used to define that a small variety of content media representations should be used, the system may compare the similarity of content media representations selected for pairings with different captions and select content media representations that have greater similarity in order to reduce the variety in the album being produced.

The UI 600 may also include one or more buttons or icons 625-635, 655 that may be used by the user to control the album generation process. For example, button 625 may be used to reopen a previously entered textual summary 610*a*-610*c* for editing via the text entry window 620. Conversely, button 630 may be used to submit text entered into the text entry window 620 as a textual summary 610*a*-610*c*. Further, button 655 may be used to upload additional content media representations 605*a*-605*c* for use in generating the media album. Additionally, once a user has used the UI 600 to input all the desired content media representations 605*a*-605*c*, textual summaries 610*a*-610*c*, and adjust the album generation settings using controls 640-650, button 635 may be used to have the system generate the media album. Once the system is generated the media album, UI 600 may transition to UI 700 illustrated in FIG. 7.

UI 700 includes some similar features as those illustrated in UI 600 and thus similar reference numerals have been used and redundant description has been omitted. As illustrated, UI 700 includes an album or photo book preview window 705 displaying textual summary-content media representation pairs. For example, content media representation 605*c* has been selected as content media representation 1 and paired with textual summary 610*b*, which has been selected as textual summary 1. Similarly, content media representation 605*a* has been selected as content media representation 2 and paired with textual summary 610*c*, which has been selected as textual summary 2. Further, new textual summaries 610*d* and 610*e* and new content media representations 605*d* and 605*e* have been added in UI 700.

UI 700 may be used by a user to modify the album generation settings using the album generation settings window 615, previously discussed above with respect to UI 600, and/or modify the generated album by dragging different content media representations 605*b*, 605*d*, 605*e* or textual summaries 610*a*, 610*d*, 610*e* into the album preview window 705. Once the user has used UI 700 to modify the generated album, button 735 may be used to regenerate the media album based on the changes the user has specified.

Example Computing Environment

Figure 8:
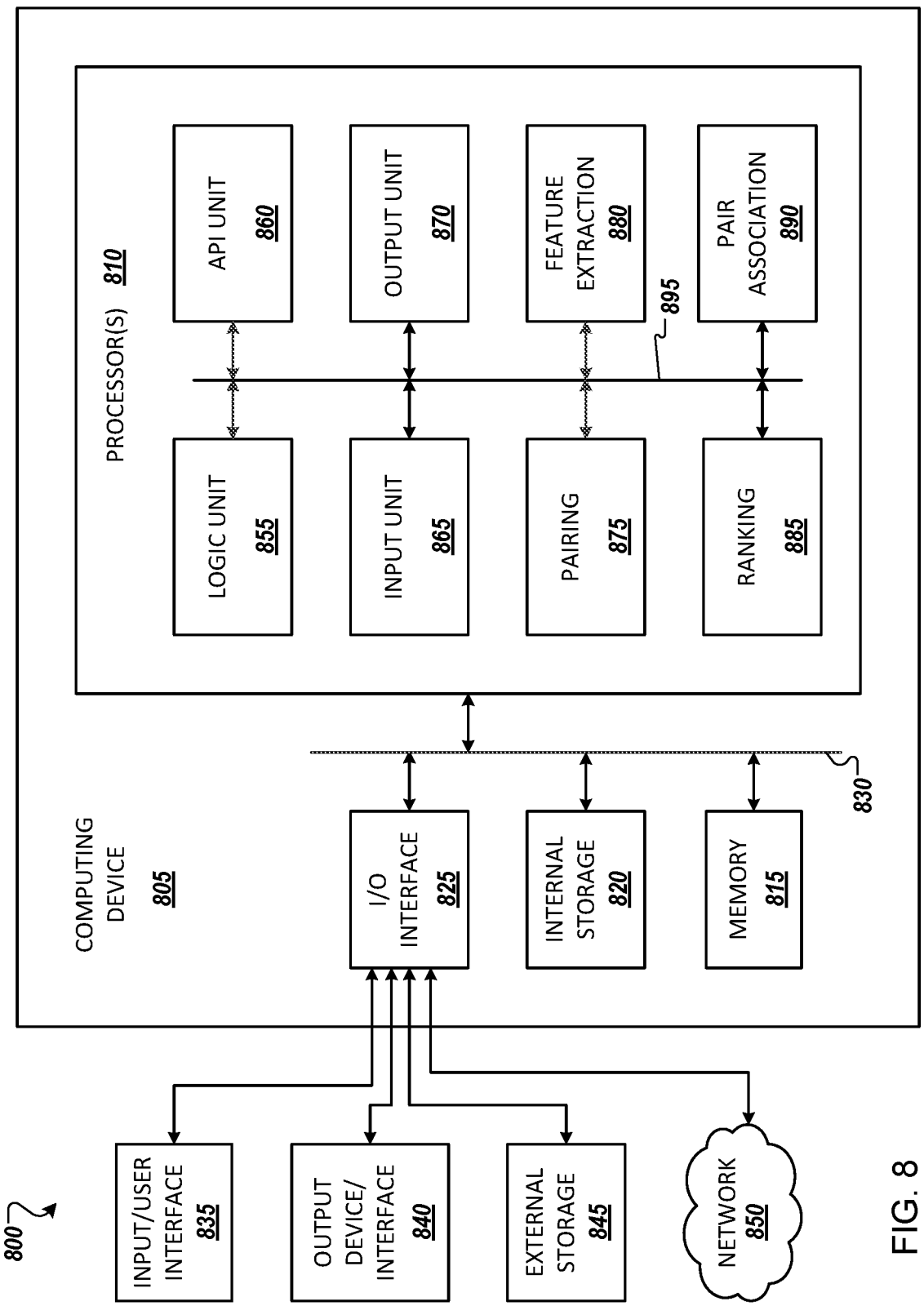
FIG. 8 illustrates an example computing environment with an example computer device suitable for use in some example implementations of the present application.

FIG. 8 illustrates an example computing environment 800 with an example computer device 805 suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/interface 835 and output device/interface 840. Either one or both of input/interface 835 and output device/interface 840 can be a wired or wireless interface and can be detachable. Input/interface 835 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 840 may include a display, television, monitor, printer, speaker, braille, or the like. In some example implementations, input/interface 835 (e.g., user interface) and output device/interface 840 can be embedded with, or physically coupled to, the computing device 805. In other example implementations, other computing devices may function as, or provide the functions of, an input/interface 835 and output device/interface 840 for a computing device 805. These elements may include, but are not limited to, well-known AR hardware inputs so as to permit a user to interact with an AR environment.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, pairing unit 875, feature extraction unit 880, ranking unit 885, pair association unit 890, and inter-unit communication mechanism 895 for the different units to communicate with each other, with the OS, and with other applications (not shown).

For example, the pairing unit 875, feature extraction unit 880, ranking unit 885, and pair association unit 890 may implement one or more processes shown in FIGS. 1-5. The described units and elements can be varied in design, function, configuration, or implementation and are not limited to the descriptions provided.

In some example implementations, when information or an execution instruction is received by API unit 860, it may be communicated to one or more other units (e.g., logic unit 855, input unit 865, pairing unit 875, feature extraction unit 880, ranking unit 885, and pair association unit 890). For example, the pairing unit 875 may pair each caption or textual summary with all of the images or content representations under consideration for an image album or photo book and all of the pairs may be communicated to the feature extraction unit 880. Further, the feature extraction unit 880 may extract content features or embeddings from each textual summary-content representation pair and provide the extracted content features or embeddings to the ranking unit 885. Additionally, the ranking unit 885 may score the similarity of textual summary to content representation in each pair and rank all of the pairs based on the scores. The ranking of all the pairs may be provided to the pair association unit 890 which selects or associates individual pairs for use in generation of the image album or photo book, which may be output using the output unit 870.

In some instances, the logic unit 855 may be configured to control the information flow among the units and direct the services provided by API unit 860, input unit 865, pairing unit 875, feature extraction unit 880, ranking unit 885, and pair association unit 890 in some example implementations described above. For example, the flow of one or more processes or implementations may be controlled by logic unit 855 alone or in conjunction with API unit 860.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of associating textual summaries with pieces of data representative of media content, the method comprising:

generating a user interface having a input region;

receiving a plurality of textual summaries via the input region of the user interface, each textual summary representative of an event;

pairing, by a neural network, each received textual summary with each of a plurality of pieces of data, each piece of data representative of media content, to generate a plurality of text-data pairings;

associating a first textual summary selected from the plurality of textual summaries with a first piece of data selected from the plurality of pieces of data based on a similarity of content features extracted from each received textual summary to content features extracted from each piece of data in each of the plurality of text-data pairings;

excluding the first piece of data from the plurality of pieces of data thereby creating a subset of pieces of data representative of the remaining media content;

based in part on the exclusion, associating a second textual summary selected from the plurality of textual summaries with a second piece of data selected from the subset of pieces of data based on the similarity of content features extracted from each received text summary to content features extracted from each piece of data in each of the plurality of text-data pairings; and generating a media content album based on the association between the first textual summary and the first piece of data and the association between the second textual summary and the second piece of data.

2. The method of claim 1, wherein the associating the first textual summary with the first piece of data is based on the similarity of content features extracted from the first piece of data to the first textual summary being the highest similarity of any of the plurality of text-data pairings; and wherein the associating the second textual summary with the second piece of data is based on the similarity of content features extracted from the second piece of data to the second textual summary being the second highest similarity of any of the plurality of text-data pairings.

3. The method of claim 1, wherein the associating the first textual summary with the first piece of data is based on the similarity of content features extracted from the first piece of data to the first textual summary being the highest similarity of a first subset of text-data pairs selected from the plurality of text-data pairings, the first subset comprising only text-data pairs in which the first textual summary has been paired to each of the plurality of pieces of data; and wherein the associating the second textual summary with the second piece of data is based on the similarity of content features extracted from the second piece of data to the second textual summary being the highest similarity of a second subset of text-data pairs selected from the plurality of text-data pairings, the second subset comprising only text-data pairs in which the second textual summary has been paired to each of the plurality of pieces of data.

4. The method of claim 1, wherein the associating the first textual summary with the first piece of data comprises:

clustering a first subset of the plurality of pieces of data based on content features extracted from each of the pieces of data in the subset to form a first data cluster;

determining a similarity between each of the pieces of data in the first data cluster and the first textual summary;

determining a first aggregate similarity score for the first data cluster based on the determined similarity between each of the pieces of data in the first data cluster and the first textual summary; and associating the first data cluster with the first textual summary based on the first aggregate similarity score; and wherein the associating the second textual summary with the second piece of data comprises:

clustering a second subset of the plurality of pieces of data based on content features extracted from each of the pieces of data in the subset to form a second data cluster;

determining a similarity between each of the pieces of data in the second data cluster and the second textual summary;

determining a second aggregate similarity score for the second data cluster based on the determined similarity between each of the pieces of data in the second data cluster and the second textual summary; and associating the second data cluster with the second textual summary based on the second aggregate similarity score.

5. The method of claim 1, wherein the similarity of content features extracted from each received textual summary to content features extracted from each piece of data in each of the plurality of text-data pairings is calculated based on a user profile associated with a user requesting the association of the textual summaries with the pieces of data representative of media content.

6. The method of claim 5, wherein the each of the plurality of the textual summaries is generated based on a social media post associated with a user account associated with the user requesting the association of the textual summaries with the pieces of data representative of media content.

7. The method of claim 1, wherein the similarity of content features extracted from each received textual summary to content features extracted from each piece of data in each of the plurality of text-data pairings is calculated based on at least one capture setting associated with a media capture device used to capture at least one of the plurality of the pieces of data representative of media content.

8. A non-transitory computer readable medium having stored therein a program for making a computer execute a method of associating textual summaries with pieces of data representative of media content, the method comprising:
generating a user interface having a input region;
receiving a plurality of textual summaries via the input region of the user interface, each textual summary representative of an event;
pairing, by a neural network, each received textual summary with each of a plurality of pieces of data, each piece of data representative of media content, to generate a plurality of text-data pairings;
associating a first textual summary selected from the plurality of textual summaries with a first piece of data selected from the plurality of pieces of data based on a similarity of content features extracted from each received textual summary to content features extracted from each piece of data in each of the plurality of text-data pairings;
excluding the first piece of data from the plurality of pieces of data thereby creating a subset of pieces of data representative of the remaining media content;
based in part on the exclusion, associating a second textual summary selected from the plurality of textual summaries with a second piece of data selected from the subset of pieces of data based on the similarity of content features extracted from each received text summary to content features extracted from each piece of data in each of the plurality of text-data pairings; and
generating a media content album based on the association between the first textual summary and the first piece of data and the association between the second textual summary and the second piece of data.

9. The non-transitory computer readable medium of claim 8, wherein the associating the first textual summary with the first piece of data is based on the similarity of content features extracted from the first piece of data to the first textual summary being the highest similarity of any of the plurality of text-data pairings; and
wherein the associating the second textual summary with the second piece of data is based on the similarity of content features extracted from the second piece of data to the second textual summary being the second highest similarity of any of the plurality of text-data pairings.

10. The non-transitory computer readable medium of claim 8, wherein the associating the first textual summary with the first piece of data is based on the similarity of content features extracted from the first piece of data to the first textual summary being the highest similarity of a first subset of text-data pairs selected from the plurality of text-data pairings, the first subset comprising only text-data pairs in which the first textual summary has been paired to each of the plurality of pieces of data; and
wherein the associating the second textual summary with the second piece of data is based on the similarity of content features extracted from the second piece of data to the second textual summary being the highest similarity of a second subset of text-data pairs selected from the plurality of text-data pairings, the second subset comprising only text-data pairs in which the second textual summary has been paired to each of the plurality of pieces of data.

11. The non-transitory computer readable medium of claim 8, wherein the associating the first textual summary with the first piece of data comprises:
clustering a first subset of the plurality of pieces of data based on content features extracted from each of the pieces of data in the subset to form a first data cluster;
determining a similarity between each of the pieces of data in the first data cluster and the first textual summary;
determining a first aggregate similarity score for the first data cluster based on the determined similarity between each of the pieces of data in the first data cluster and the first textual summary; and
associating the first data cluster with the first textual summary based on the first aggregate similarity score; and
wherein the associating the second textual summary with the second piece of data comprises:
clustering a second subset of the plurality of pieces of data based on content features extracted from each of the pieces of data in the subset to form a second data cluster;
determining a similarity between each of the pieces of data in the second data cluster and the second textual summary;
determining a second aggregate similarity score for the second data cluster based on the determined similarity between each of the pieces of data in the second data cluster and the second textual summary; and
associating the second data cluster with the second textual summary based on the second aggregate similarity score.

12. The non-transitory computer readable medium of claim 8, wherein the similarity of content features extracted from each received textual summary to content features extracted from each piece of data in each of the plurality of text-data pairings is calculated based on a user profile associated with a user requesting the association of the textual summaries with the pieces of data representative of media content.

13. The non-transitory computer readable medium of claim 12, wherein the each of the plurality of the textual summaries is generated based on a social media post associated with a user account associated with the user requesting the association of the textual summaries with the pieces of data representative of media content.

14. The non-transitory computer readable medium of claim 8, wherein the similarity of content features extracted from each received textual summary to content features extracted from each piece of data in each of the plurality of text-data pairings is calculated based on at least one capture setting associated with a media capture device used to capture at least one of the plurality of the pieces of data representative of media content.

15. A computer apparatus configured to associate textual summaries with pieces of data representative of media content, the computer apparatus comprising:
- a memory storing a plurality of pieces of data representative of media content; and
- a processor executing a process of visualizing recommended pieces of media content based on a viewed piece of media content, the process comprising:
  - providing a user with an interface to submit a plurality of textual summaries, each textual summary representative of an event;
  - pairing, by a neural network, each provided textual summary with each of the plurality of pieces of data stored in memory to generate a plurality of text-data pairings;
  - associating a first textual summary selected from the plurality of textual summaries with a first piece of data selected from the plurality of pieces of data based on a similarity of content features extracted from each received textual summary to content features extracted from each piece of data in each of the plurality of text-data pairings;
  - excluding the first piece of data from the plurality of pieces of data thereby creating a subset of pieces of data representative of the remaining media content;
  - based in part on the exclusion, associating a second textual summary selected from the plurality of textual summaries with a second piece of data selected from the subset of pieces of data based on the similarity of content features extracted from each received text summary to content features extracted from each piece of data in each of the plurality of text-data pairings; and
  - providing a media content album based on the association between the first textual summary and the first piece of data and the association between the second textual summary and the second piece of data.

16. The computer apparatus of claim 15, wherein the associating the first textual summary with the first piece of data is based on the similarity of content features extracted from the first piece of data to the first textual summary being the highest similarity of any of the plurality of text-data pairings; and
- wherein the associating the second textual summary with the second piece of data is based on the similarity of content features extracted from the second piece of data to the second textual summary being the second highest similarity of any of the plurality of text-data pairings.

17. The computer apparatus of claim 15, wherein the associating the first textual summary with the first piece of data comprises:
- clustering a first subset of the plurality of pieces of data based on content features extracted from each of the pieces of data in the subset to form a first data cluster;
- determining a similarity between each of the pieces of data in the first data cluster and the first textual summary;
- determining a first aggregate similarity score for the first data cluster based on the determined similarity between each of the pieces of data in the first data cluster and the first textual summary; and
- associating the first data cluster with the first textual summary based on the first aggregate similarity score; and
- wherein the associating the second textual summary with the second piece of data comprises:
- clustering a second subset of the plurality of pieces of data based on content features extracted from each of the pieces of data in the subset to form a second data cluster;
- determining a similarity between each of the pieces of data in the second data cluster and the second textual summary;
- determining a second aggregate similarity score for the second data cluster based on the determined similarity between each of the pieces of data in the second data cluster and the second textual summary; and
- associating the second data cluster with the second textual summary based on the second aggregate similarity score.

* * * * *